United States Patent [19]
Ikeda

[11] Patent Number: 5,438,567
[45] Date of Patent: Aug. 1, 1995

[54] PACKET SWITCHING APPARATUS

[75] Inventor: Chinatsu Ikeda, Tokyo, Japan

[73] Assignee: NEC Corporation, Tokyo, Japan

[21] Appl. No.: 116,379

[22] Filed: Sep. 3, 1993

[30] Foreign Application Priority Data

Sep. 7, 1992 [JP] Japan .................. 4-237927

[51] Int. Cl.$^6$ ........................................... H04L 12/56
[52] U.S. Cl. ......................................... 370/60; 370/61
[58] Field of Search .................. 370/58.1, 60, 60.1, 370/61, 85.9, 94.1, 108

[56] References Cited

U.S. PATENT DOCUMENTS

| | | | |
|---|---|---|---|
| 5,140,583 | 8/1992 | May et al. ........................ | 370/60 |
| 5,204,858 | 4/1993 | Kinashi et al. ................... | 370/60 |
| 5,222,064 | 6/1993 | Sagawa ........................... | 370/85.9 |

OTHER PUBLICATIONS

Suzuki, H. et al, "Investigation of Converter Architecture for Asynchronous Transfer Mode", Technical Research Report SSE88-60, No. 128, Jul. 20, 1988 of the Institute of Electronics, Information, and Communication Engineers, pp. 61-66.

Suzuki, H., et al, "Output-Buffer Switch Architecture for Asynchronous Transfer Mode", International Journal of Digital and Analog Cabled Systems, vol. 2, 1989, pp. 269-276.

Kuwahara, H., et al, "A Shared Buffer Memory Switch for an ATM Exchange", IEEE, 1989, pp. 118-122.

Primary Examiner—Benedict V. Safourek
Attorney, Agent, or Firm—Ostrolenk, Faber, Gerb & Soffen

[57] ABSTRACT

In the packet switching apparatus of the present invention, packets are inputted, parallel-expanded by a serial-parallel converter, multiplexed on a time division multiplexer, and address information of the packets is discriminated by address filters provided corresponding to the output ports. The address filters receive packets carrying relevant addresses and transmit them to corresponding buffers for storage. The buffers monitor the number of stored packets, and according to the results of comparison of the number of stored packets and buffer capacity, send control signals to reserve memory control assemblies to effect connection and disconnection between the reserve memories and the buffers. The stored packets are then sent from the buffers to the output ports.

11 Claims, 11 Drawing Sheets

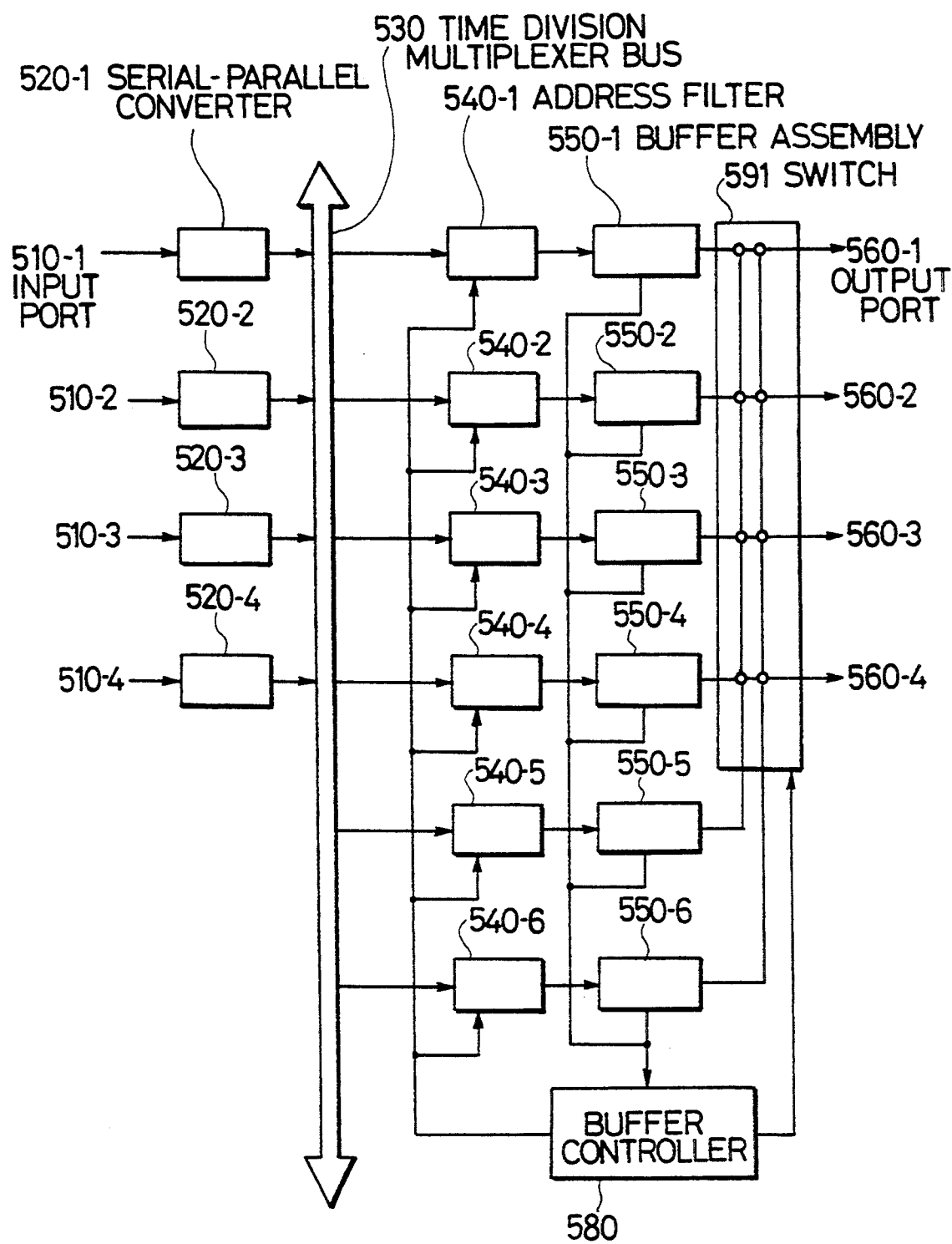

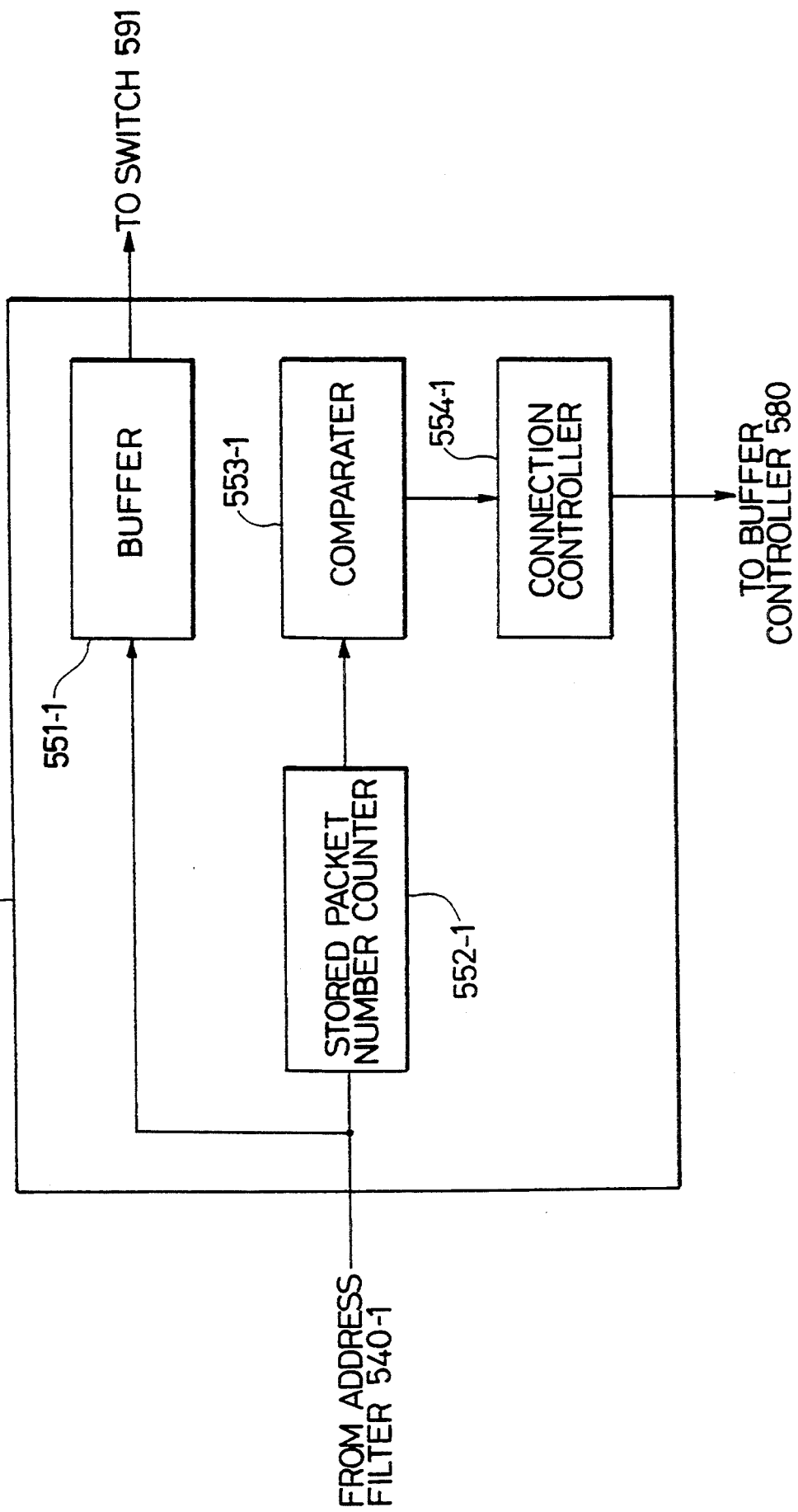

PACKET SWITCHING APPARATUS

BACKGROUND OF THE INVENTION

1. Field of the Invention

The present invention relates to a packet switching apparatus, and in particular to an output-buffer packet switching apparatus in which packets inputted from a plurality of input ports are multiplexed and then, based on the address information conferred to the packets, stored in buffers corresponding to a plurality of output ports, following which the packets are outputted to the output ports.

2. Description of the Related Art

All information including voice, data, and images can be converted to packets, and super-high-speed packet switching apparatus that use an abbreviated protocol for the purpose of high-volume and super-high-speed transmission as well as for conversion are attracting considerable attention. Papers on methods of constructing this type of super-high-speed packet switching apparatus include "Investigation of Converter Architecture for Asynchronous Transfer Mode" by Suzuki et al. in the Technical Research Report SSE88-60 (1988) of the Institute of Electronics, Information, and Communication Engineers. In this paper is disclosed a packet switching apparatus in which packets inputted from a plurality of input ports are time division multiplexed and transmitted to each output port, and at each output port, the desired packet is stored in a buffer memory administered according to FIFO [First In First Out] rules.

FIG. 1 shows an example of the above-described switching apparatus. This switching apparatus has four input ports and four output ports. In this packet switching apparatus, packets inputted from input ports 610-1–610-4 are parallel expanded at serial-parallel converters 620-1–620-4. The parallel expanded packets are then time division multiplexed on time division multiplexer bus 630. Address filters 640-1–640-4 discriminate the address information carried by the packets on time division multiplexer bus 630, and if the output port address corresponds to that address filter, the packet is received and stored in corresponding buffers 650-1–650-4 that are administered according to FIFO rules. If the output port address does not correspond to that address filter, reception does not occur. The received packet is read from buffers 650-1–650-4 and outputted to output ports 660-1–660-4.

In a packet switching apparatus having the composition shown in FIG. 1, there are cases in which packets from the four input ports 610-1–610-4 arrive at buffer 650-1 corresponding to output port 660-1 in the same time slot, while only one packet is outputted per time slot. Consequently, in order to output all of the packets to the output ports, a time interval of four time slots is required, and if packets addressed to output port 660-1 arrive during this time, the number of packets stored in buffer 650-1 corresponding to output port 660-1 will not decrease. For such reasons, in packet switching apparatus having buffers on the output side, packets are generally not uniformly stored among the buffers and bias has been known to occur. For this reason, there is the problem that in cases in which packets are stored unevenly and in quantity in the buffer of each output port, the capacity of each buffer must be made great in order to achieve a sufficiently low abandonment rate.

SUMMARY OF THE INVENTION

The purpose of the present invention is to provide a packet switching apparatus that is an output-buffer packet switching apparatus wherein packets inputted from a plurality of input ports are multiplexed and, after being stored in any of buffers corresponding to a plurality of output ports based on address information conferred to each of the packets, outputted to the output ports; and wherein a sufficiently low abandonment rate can be achieved without requiring that the capacity of each buffer be greater than necessary.

In order to achieve the above purpose, a first embodiment of the packet switching apparatus of the present invention is an output-buffer packet switching apparatus wherein packets inputted from a plurality of input ports are multiplexed and, after being stored in any of buffers corresponding to a plurality of output ports based on address information conferred to each of the packets, outputted to the output ports; and comprises address filters located at each and every output port; buffers located at each and every one of the output ports that store the packets outputted from the address filters; reserve memories that are divided into a plurality of blocks and that are used by being connected to the buffers in units of blocks; and control means that monitors the number of packets stored in the buffers, and when the number of stored packets exceeds a threshold value, connects the reserve memories to the buffers and stores the inputted packets in the reserve memories when the number of the stored packets exceeds the capacity of the buffers, and during the time the buffers are connected to the reserve memories, transmits packets stored within the reserve memories to the buffers each time the packets stored within the buffers are outputted.

The above-described threshold value may also be equal to the capacity of the buffer.

This embodiment also includes a device in which the above threshold value is a first threshold value that is smaller than the capacity of the buffers, and a second threshold value is provided that is smaller than the first threshold value, and in which, when the number of stored packets exceeds the first threshold value, the control means connects the reserve memories to the buffers, when the number of stored packets exceeds the capacity of the buffers, the control means stores the inputted packets into the reserve memories, and when the number of stored packets falls below the second threshold value, the control means releases the reserve memories from the buffers.

A second embodiment of the packet switching apparatus of the present invention is an output-buffer packet switching apparatus wherein packets inputted from a plurality of input ports are multiplexed and, after being stored in any of buffers corresponding to a plurality of output ports based on address information conferred to each of the packets, outputted to the output ports; and comprises address filters located at each and every output port; buffers located at each and every one of the output ports that store the packets outputted from the address filters; reserve memories that are divided into a plurality of blocks and that are used by being connected to the buffers in units of blocks; and control means that monitors the number of packets stored in the buffers and, when the number of stored packets exceeds a threshold value, connects the reserve memories to the buffers and stores the inputted packets in the reserve memories, and during the time the buffers are connected to the reserve memories, connects the reserve memories to the output ports and outputs the packets stored in the reserve memories when there are no packets stored within the buffers.

The above-described threshold value may also be equal to the capacity of the buffers.

A third embodiment of the packet switching apparatus of the present invention is an output-buffer packet switching apparatus wherein packets inputted from a plurality of input ports are multiplexed and, after being stored in any of buffers corresponding to a plurality of output ports based on address information conferred to each of the packets, outputted to the output ports; and comprises address filters located at each and every output port; normal buffers located at each and every output port that store the packets outputted from the address filters; a set of reserve buffers made up of one or more reserve buffers; first connection means that connects the address filters to the normal buffers and to the reserve buffers; second connection means that connects the normal buffers and the reserve buffers to the output ports;

and control means that monitors the number of packets stored in the normal buffers and, when the number of stored packets exceeds a threshold value, connects the address filters to the set of reserve buffers by means of the first connection means, and when the number of stored packets exceeds the capacity of the buffers, stores the inputted packets in the reserve buffers during the time until the number of stored packets [in the normal buffers] becomes 0, and when the number of stored packets reaches 0, connects the address filters to the normal buffers and connects the reserve buffers to the output ports by means of the second connection means.

The above-described threshold value may also be equal to the capacity of the buffers.

A fourth embodiment of the packet switching apparatus of the present invention is an output-buffer packet switching apparatus wherein packets inputted from a plurality of input ports are multiplexed and, after being stored in any of buffers corresponding to a plurality of output ports based on address information conferred to each of the packets, outputted to the output ports; and comprises address filters located at each and every output port; buffers provided in a number greater than the number of output ports that store the packets outputted from the address filters; third connection means that connects the address filters to arbitrary buffers; fourth connection means that connects arbitrary buffers with the output ports; and control means that monitors the number of packets stored in the buffers and, when the number of stored packets exceeds a threshold value, connects the address filters to the still unused buffers by means of the third connection means, when the number of stored packets exceeds the capacity of the buffers, stores the inputted packets into the latter buffers, and when the number of packets stored in the former buffers reaches 0, switches the connection with the output ports from the former buffers to the latter buffers by means of the fourth connection means.

The above-described threshold value may also be equal to the capacity of the buffers.

A fifth embodiment of the packet switching apparatus of the present invention is an output-buffer packet switching apparatus wherein packets inputted from a plurality of input ports are multiplexed and, after being stored in any of buffers corresponding to a plurality of output ports based on address information conferred to each of the packets, outputted to the output ports; and comprises address filters provided in a number greater than the number of output ports; buffers provided to correspond with the address filters; fifth connection means for connecting the buffers with arbitrary output ports; and control means that monitors the number of packets stored in the buffers, and when the number of stored packets exceeds a threshold value, sets the addresses of packets bearing identical output port destinations to still unused address filters, and when the number of stored packets exceeds the capacity of the buffers, stores the inputted packets in the buffers corresponding to those address filters, and when the number of stored packets reaches 0, switches the connections with the output ports from the former buffers to the latter buffers by means of the fifth connection means.

The above-described threshold value may also be equal to the capacity of the buffers.

BRIEF DESCRIPTION OF THE DRAWINGS

FIG. 10 is a block diagram showing the construction of the fifth embodiment of a packet switching apparatus of the present invention; and FIG. 11 is a block diagram showing the construction of buffer assembly 550-1 in FIG. 10.

DETAILED DESCRIPTION OF THE PREFERRED EMBODIMENTS

Figure 1:
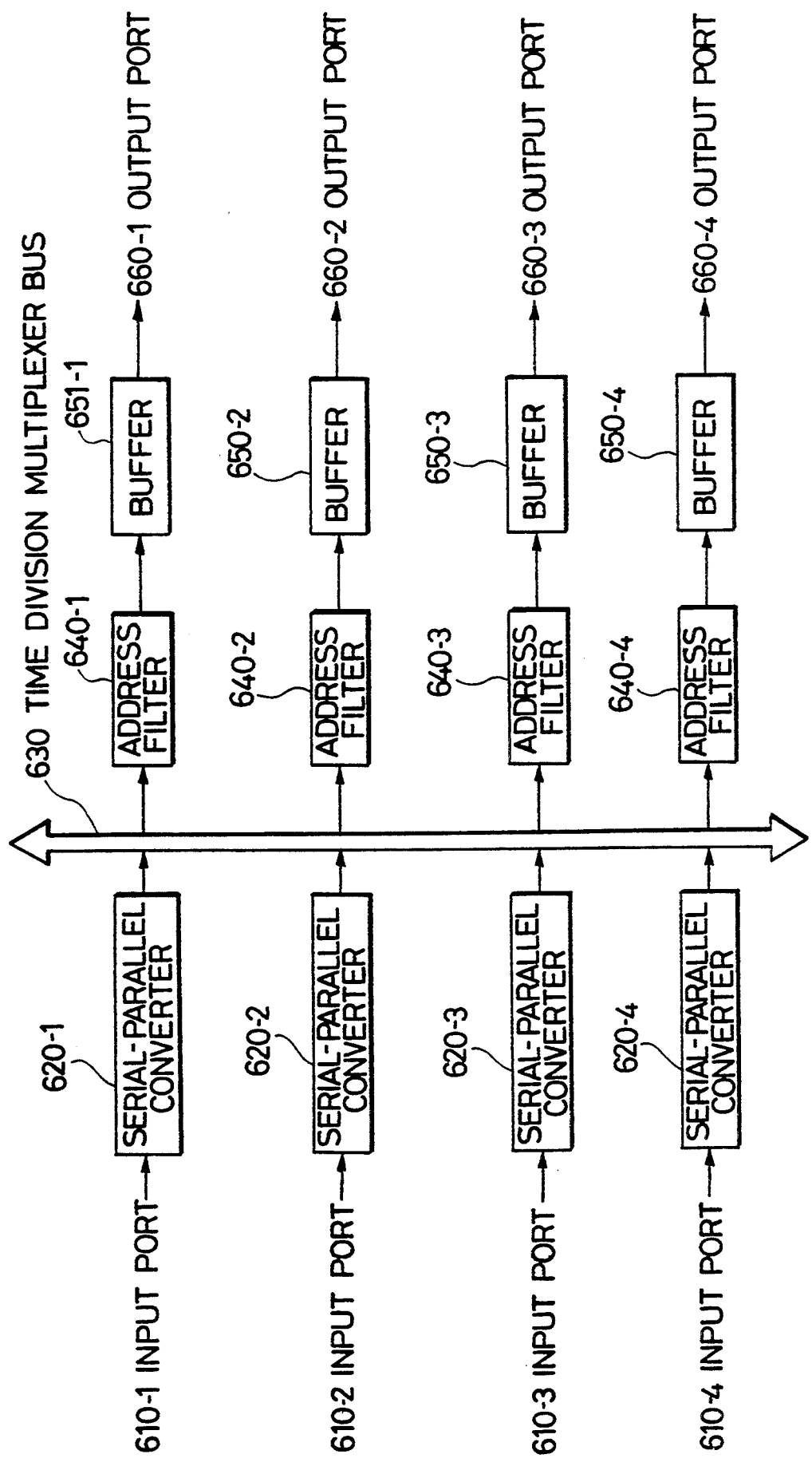
FIG. 1 is a block diagram showing the construction of a packet switching apparatus of the prior art.
Figure 2:
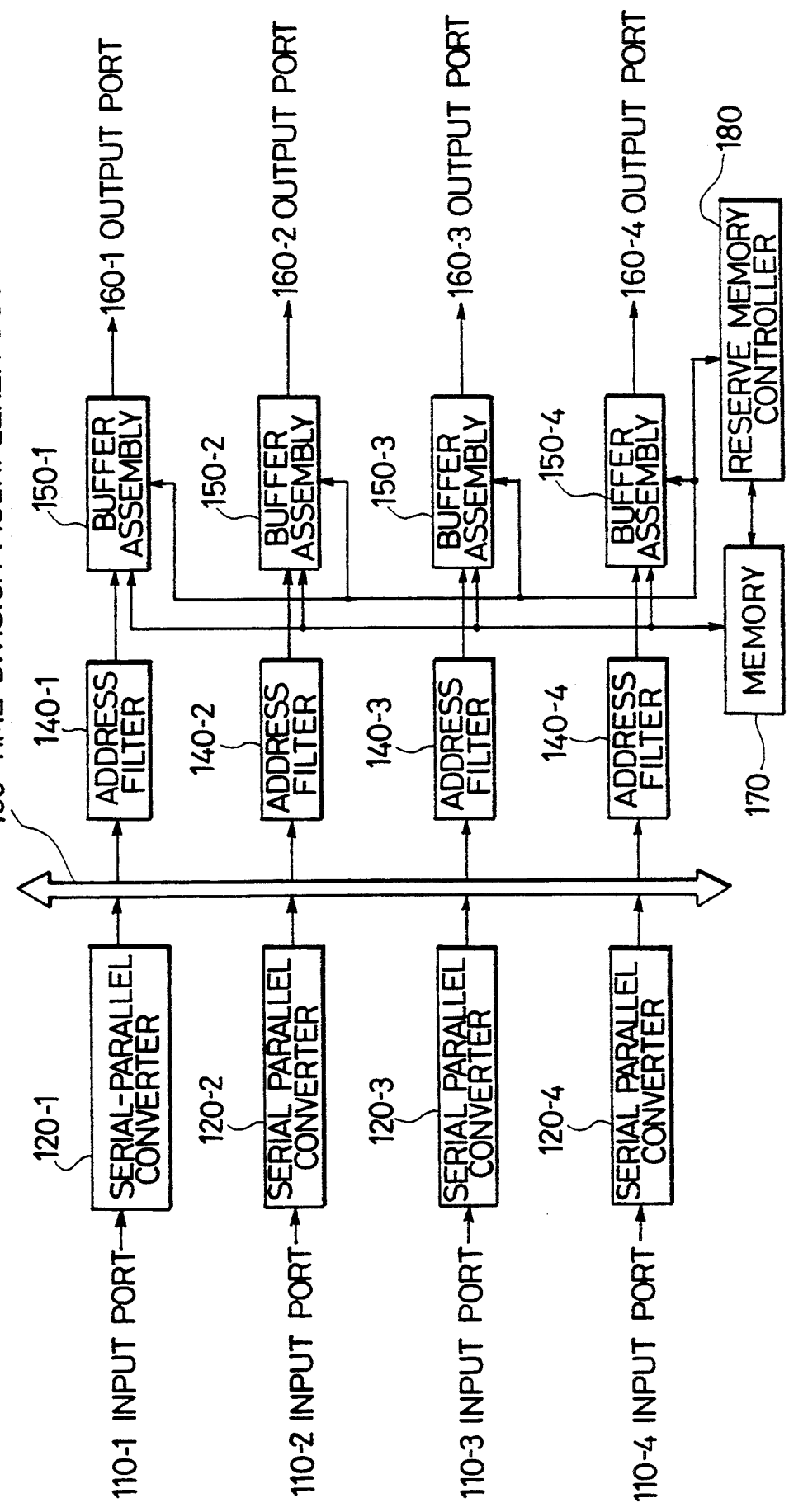
FIG. 2 is a block diagram showing the construction of the first embodiment of a packet switching apparatus of the present invention.

As shown in FIG. 2, the first embodiment of the packet switching apparatus of the present invention is composed of input ports 110-1–110-4 that input packets; serial-parallel converters 120-1–120-4 connected to each input port 110-1–110-4 that parallel expand the packets; a time division multiplexer bus 130 that is connected to the output of each of serial-parallel converters 120-1–120-4; address filters 140-1–140-4 connected to time division multiplexer bus 130 that discriminate address information and receive packets carrying a relevant address; buffer assemblies 150-1–150-4 having buffers to receive and store packets from address filters 140-1–140-4 and that administer and control the monitoring of the number of packets stored in each buffer and the connections with the below-described reserve memory 170; output ports 160-1–160-4 connected to buffer assemblies 150-1–150-4 that output packets; reserve memory 170 that is connected to buffer assemblies 150-1–150-4 and used as a buffer; reserve memory controller 180 that connects reserve memory 170 to buffer assemblies 150-1–150-4 at the time of demand from buffer assemblies 150-1–150-4.

Figure 3:
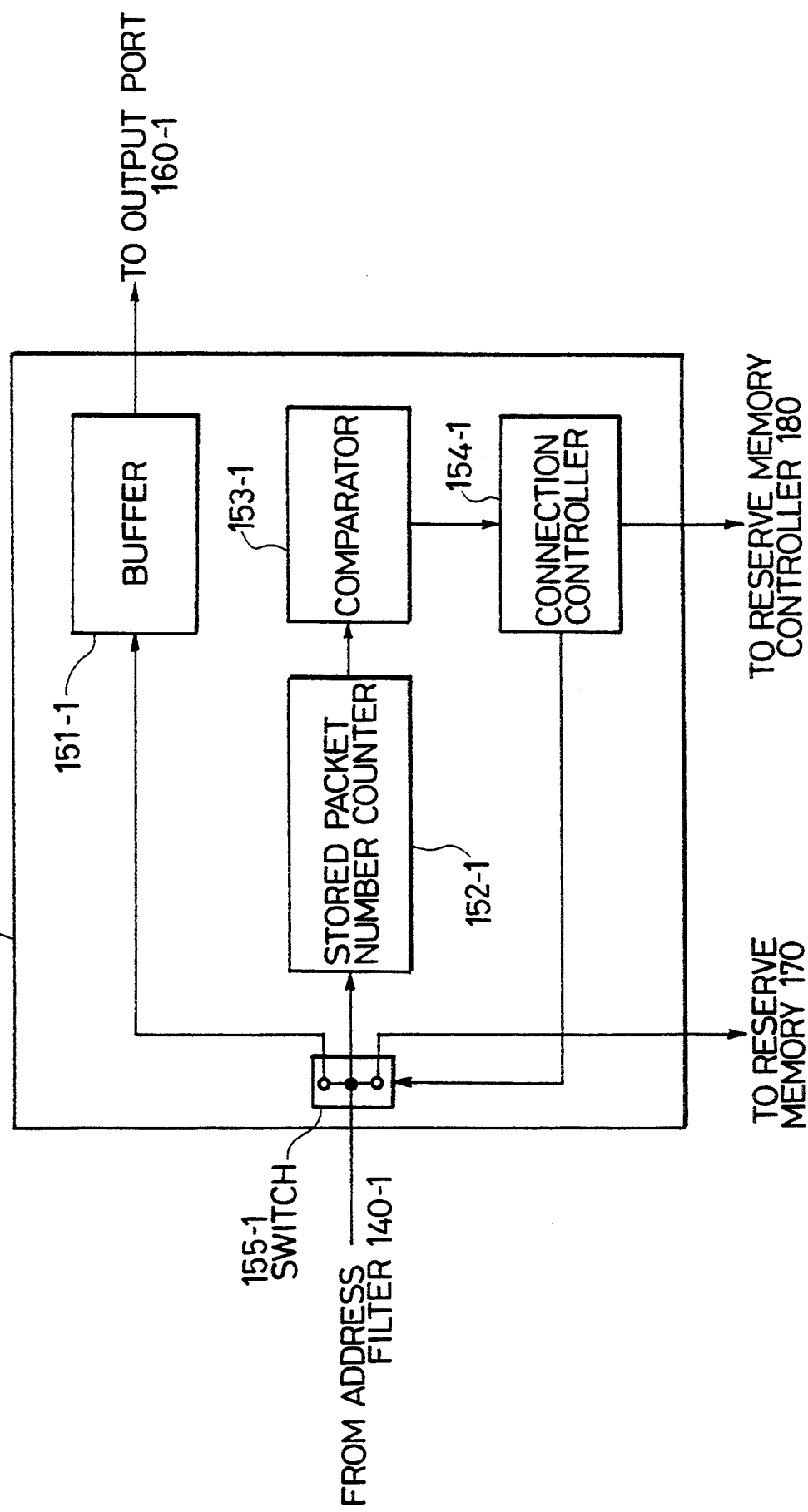
FIG. 3 is a block diagram showing the construction of buffer assembly 150-1 in FIG. 2.

Buffer assemblies 150-1–150-4 will be explained with reference to buffer assembly 150-1 shown in FIG. 3. The buffer assembly is composed of buffer 151-1 that stores packets received from address filter 140-1; stored packet number counter 152-1 that counts the number of packets stored in buffer 151-1; comparator 153-1 that compares the capacity of buffer 151-1 with the number of stored packets; connection controller 154-1 that administers whether or not reserve memory 170 is in use, and, from the comparison result at comparator 153-1, designates to reserve memory controller 180 the use or release of reserve memory 170; and switch 155-1 that switches the output address of packets from address filter 140-1 between buffer 151-1 and reserve memory 170. Reserve memory 170 is divided into two blocks, and buffers 151-1–151-4 of a plurality of output ports are able to use the reserve memory 170 at the same time. Reserve memory controller 180 holds a reserve memory address administration table, and the reserve memory address administration table controls the head address of each block of reserve memory 170 and the identification number of output ports 160-1–160-4 corresponding to the buffer that assigned that block. When reserve memory 170 is assigned to a buffer, the identification number of the output port of the assigned buffer is written to the reserve memory address administration table, and when reserve memory 170 is released, the reserve memory address administration table is updated by clearing that output port identification number.

The operation of this embodiment will next be explained.

As an example, when there is input of a packet from input port 110-4 addressed to output port 160-1, address filter 140-1 receives the packet and adds +1 to stored packet number counter 152-1. If the value of stored packet number counter 152-1 is equal to or less than the capacity of buffer 151-1, switch 155-1 connects input of address filter 140-1 and buffer 151-1 and stores the inputted packet in buffer 151-1. If the number of stored packets is +1 over the capacity of buffer 151-1, connection controller 154-1 transmits to reserve memory controller 180 a control signal demanding connection of buffer assembly 150-1 with reserve memory 170. Reserve memory controller 180, having received this control signal, refers to the reserve memory address administration table, detects blocks lacking a marking of the assigned output port, writes the output port identification number into the relevant area of the reserve memory address administration table, and at the same time, connection controller 154-1 switches switch 155-1 to reserve memory 170 and stores the packet to reserve memory 170. If the value of stored packet number counter 152-1 is +1 over the capacity of buffer 151-1, switch 155-1 is connected to reserve memory 170, and packets inputted from input port 110-1 are stored to reserve memory 170 under the control of connection controller 154-1. Each time packets stored in buffer 151-1 are outputted from buffer 151-1, the packets stored to reserve memory 170 are taken out one by one and stored in buffer 151-1. If the value of stored packet number counter 152-1 is at or below the capacity of buffer 151-1, connection controller 154-1 sends to reserve memory controller 180 a control signal demanding release of reserve memory 170. Reserve memory controller 180, having received this control signal, erases the assigned output port identification number of the reserve memory address administration table.

In the above-described embodiment, the threshold value for the number of stored packets when connection controller 154-1 connects reserve memory 170 to buffer assembly 150-1 is set to be equal to the capacity of buffer 151-1, but it is also possible to provide two threshold values having a relation in which the buffer capacity is greater than the first threshold value, which is in turn greater than the second threshold value (buffer capacity>first threshold value>second threshold value). In this case, when comparison at comparator 153-1 shows that the number of stored packets exceeds the first threshold value, connection controller 154-1 connects reserve memory 170 to buffer assembly 150-1, and even after reserve memory 170 has been connected, stores inputted packets to buffer 151-1 until the number of stored packets at buffer 151-1 reaches the buffer capacity. When the number of stored packets exceeds the buffer capacity, connection controller 154-1 connects the switch 155-1 within buffer assembly 150-1 to reserve memory 170 and stores packets inputted to input port 110-1 to reserve memory 170. As in the previous example, packets stored to reserve memory 170 are taken out one at a time and stored to buffer 151-1 each time a packet is outputted from buffer 151-1. When the value at stored packet number counter 152-1 falls below the second threshold value, connection controller 154-1 and reserve memory controller 180 release reserve memory 170 according to the same procedure as in the previous example.

Figure 4:
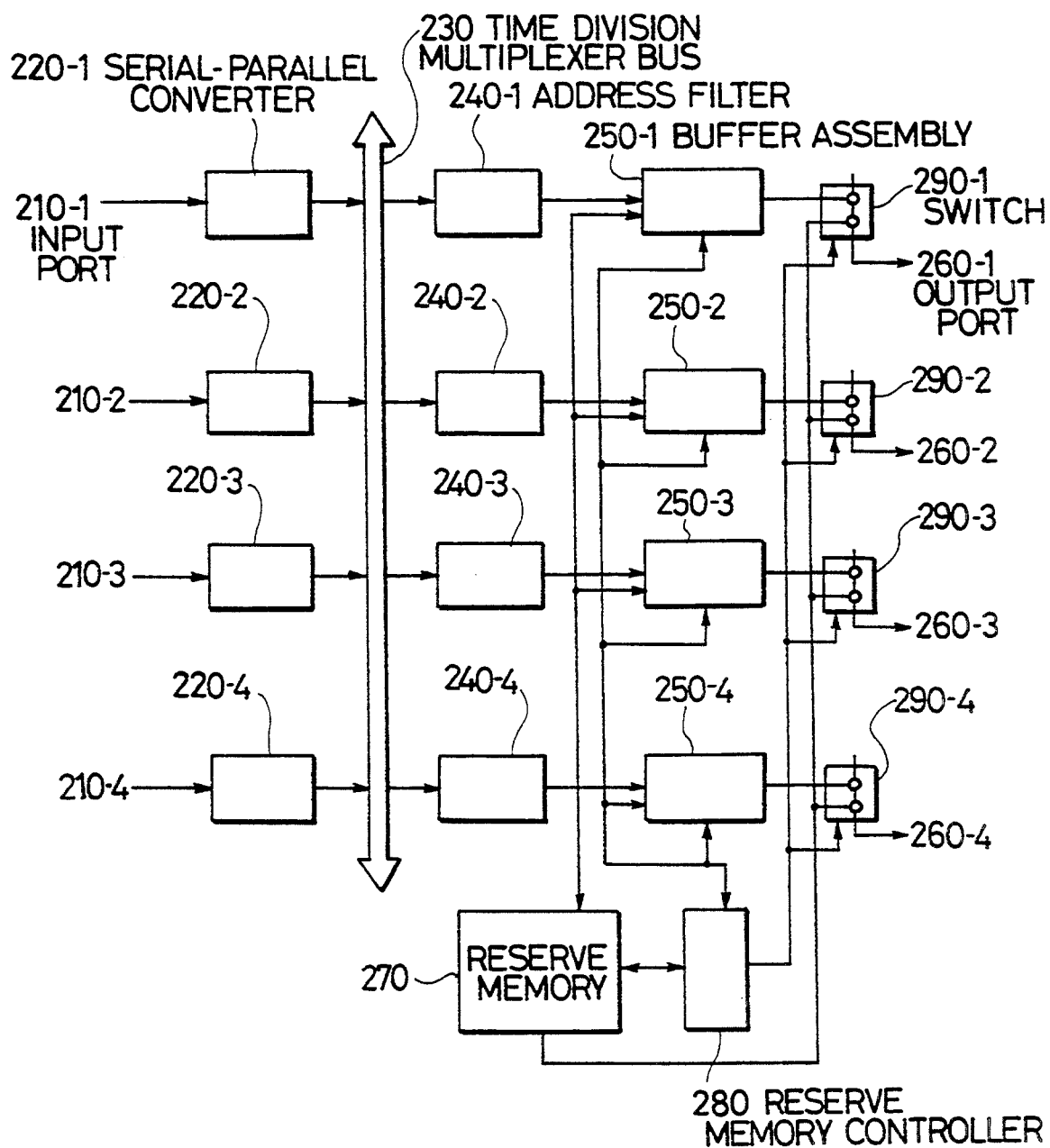
FIG. 4 is a block diagram showing the construction of the second embodiment of a packet switching apparatus of the present invention.
Figure 5:
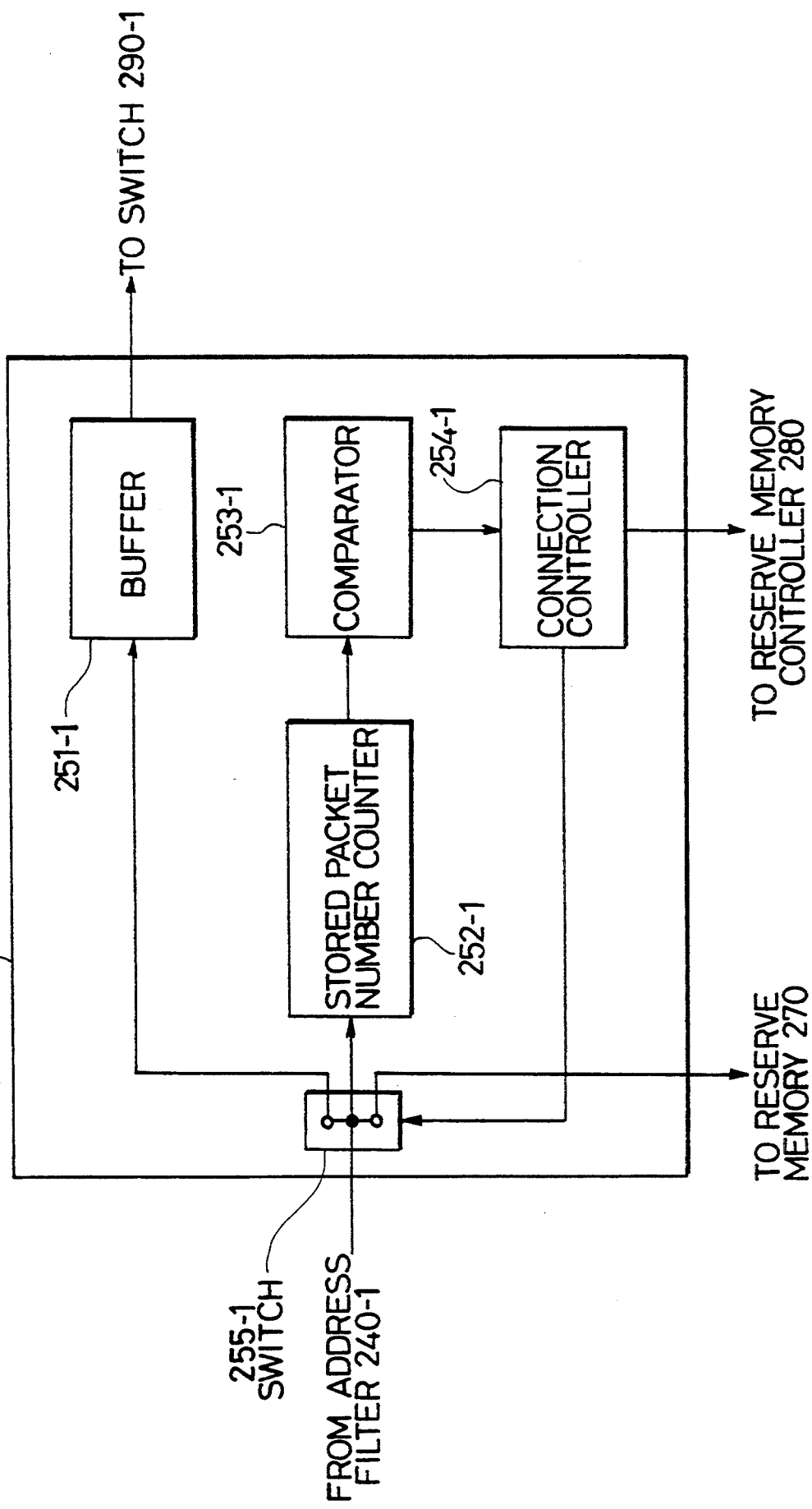
FIG. 5 is a block diagram showing the construction of buffer assembly 250-1 in FIG. 4.

FIG. 4 shows a second embodiment of the packet switching apparatus of the present invention. In this packet switching apparatus, reserve memory 270 is divided into two blocks similarly to reserve memory 170 of FIG. 2. In the packet switching apparatus of FIG. 2, the output of reserve memory 170 is connected to buffer assemblies 150-1–150-4 corresponding to each output port, but in this packet switching apparatus, the output of reserve memory 270 is connected with output ports 260-1–260-4, and switches 290-1–290-4 are provided in order to switch the source of output to output ports 260-1–260-4 between output from buffer assemblies 250-1–250-4 and output from reserve memory 270. Similarly to reserve memory controller 180 of FIG. 2, reserve memory controller 280 holds a reserve memory address administration table and carries out switching of switches 290-1–290-4. In the same way as for buffer assembly 150-1 of FIG. 3, the composition of buffer assemblies 250-1–250-4 is shown by the example of buffer assembly 250-1 shown in FIG. 5. Buffer assembly 250-1 is composed of buffer 251-1 that stores packets received from address filter 240-1; stored packet number counter 252-1 that counts the number of packets stored in buffer 251-1; comparator 253-1 that compares the capacity of buffer 251-1 with the number of stored packets; connection controller 254-1 that administers whether or not reserve memory 270 is in use, and depending on the comparison results at comparator 253-1, designates the use or release of reserve memory 270 to reserve memory controller 280; and switch 255-1 that switches the output destination of packets from address filter 240-1 between buffer 251-1 and reserve memory 270.

The operation of this embodiment will next be explained.

Explanation will be given for an example in which packets addressed to output port 260-1 are inputted from input port 210-4. The number of packets stored in buffer 251-1 then becomes greater than the capacity of buffer 251-1, and by the same process as in the case of the first embodiment, reserve memory 270 is connected to buffer 251-1. When packets are outputted from output port 260-1, packets are outputted from buffer 251-1. However, in contrast to the case of the first embodiment, packets are not transmitted from reserve memory 270 to buffer 251-1 even if space is created in buffer 251-1. Until the number of packets stored in buffer 251-1 reaches 0, connection controller 254-1 connects the input from address filter 240-1 and reserve memory 270 by means of switch 255-1 in order that packets addressed for output port 260-1 are stored in reserve memory 270. When the number of packets stored in buffer 251-1 becomes 0, connection controller 254-1 switches switch 290-1 to connect reserve memory 270 with output port 260-1 and causes output of packets from reserve memory 270. At the same time, connection controller 254-1 switches switch 255-1 to the direction of buffer 251-1 and inputted packets are stored in buffer 251-1. Reserve memory controller 280 updates the reserve memory address administration table when the used block of reserve memory 270 becomes empty and releases the connection between reserve memory 270 and buffer 251-1.

Figure 6:
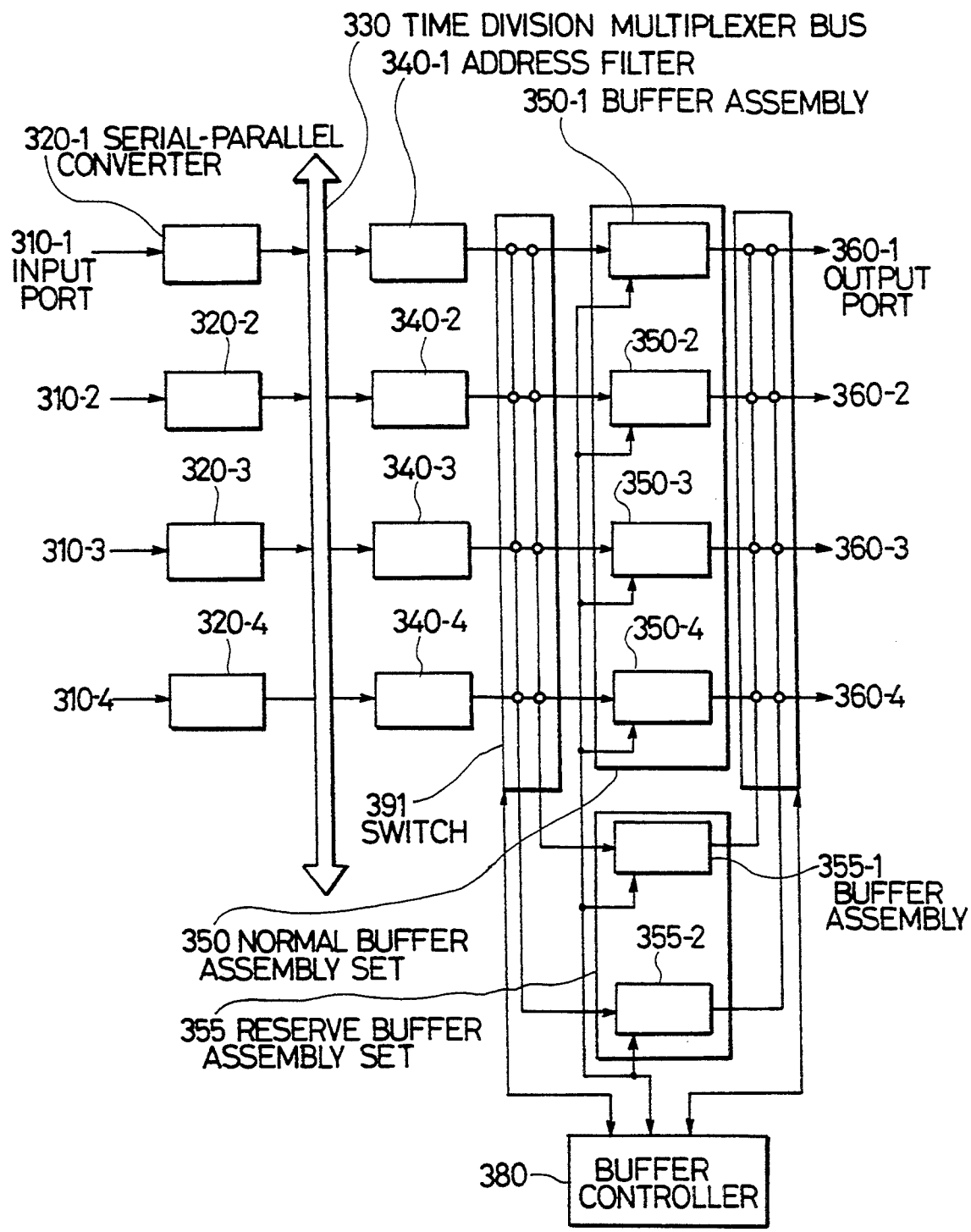
FIG. 6 is a block diagram showing the construction of the third embodiment of a packet switching apparatus of the present invention.

FIG. 6 shows a third embodiment of the packet switching apparatus of the present invention.

In the first and second embodiments, a reserve memory is provided as a reserve buffer for the common use of each output port, but in this embodiment, buffers similar to buffers corresponding to each output port are provided as reserve buffers. The group of buffers corresponding to each output port is referred to as the normal buffer set, and the group of reserve buffers is referred to as the reserve buffer set. In the present embodiment, two buffers are provided as the reserve buffer set.

This packet switching apparatus comprises: input ports 310-1–310-4 at which packets are inputted; serial-parallel converters 320-1–320-4 connected to each input port 310-1–310-4 that parallel expand the packets; time division multiplexer bus 330 that is connected to the output of each of serial-parallel converters 320-1–320-4; address filters 340-1–340-4 that discriminate address information and receive packets carrying relevant addresses; switch 391 that connects the output of address filters 340-1 340-4 to either buffer assemblies 350-1–350-4 or reserve buffer assemblies 355-1–355-4; reserve buffer assemblies 355-1, 355-2 and buffer assemblies 350-1–350-4 that are connected to switch 391 and store received packets; switch 392 that is connected to buffer assemblies 350-1–350-4 or to reserve buffer assemblies 355-1, 355-2 and that connects the output of buffer assemblies 350-1–350-4 or reserve buffer assemblies 355-1, 355-2 to any of output ports 360-1 360-4; output ports 360-1–360-4; and buffer controller 380 that carries out switching of switches 391, 392. Here, buffer assemblies 350-1–350-4 make up normal buffer set 350 and reserve buffer assemblies 355-1, 355-2 make up reserve buffer set 355.

Figure 7:
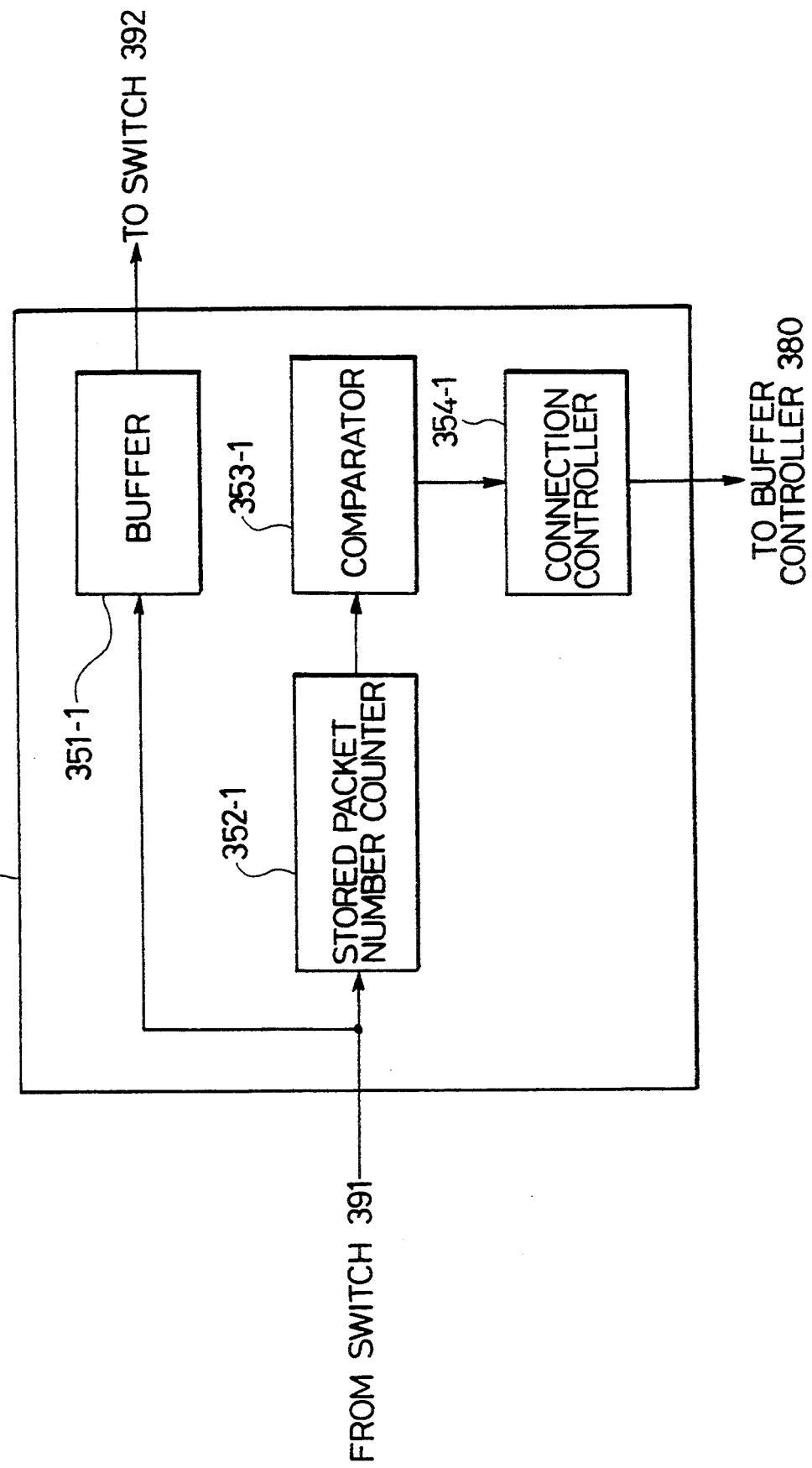
FIG. 7 is a block diagram showing the construction of buffer assembly 350-1 in FIG. 6.

FIG. 7 shows buffer assembly 350-1 as an example of buffer assemblies 350-1–350-4 and reserve buffer assemblies 355-1, 355-2 of FIG. 6. Buffer assembly 350-1 is composed of buffer 351-1; stored packet number counter 352-1 that counts the number of packets stored in buffer 351-1; comparator 353-1 that compares the count value of stored packet number counter 352-1 with the capacity of buffer 351-1; and connection controller 354-1 that controls the connections with reserve buffer assemblies 355-1, 355-2.

Buffer controller 380 holds a reserve buffer administration table for administering the usage of reserve buffer assemblies 355-1, 355-2 of reserve buffer set 355. Buffer assemblies 350-1–350-4 within normal buffer set 350 each correspond to address filters 340-1–340-4 and output ports 360-1–360-4, respectively. Switch 391 and switch 392 are incomplete matrix switches. Switch 391, based on the control of buffer controller 380, connects the output of address filters 340-1–340-4 with either buffer assemblies 350-1–350-4 within normal buffer set 350 or reserve buffer assemblies 355-1, 355-2 within reserve buffer set 355 that corresponds to output port identification number.

Next, the operation of the present embodiment will be explained.

It is assumed that a packet addressed to output port 360-1 is inputted from input port 310-4 when the number of packets stored in buffer assembly 350-1 is one less (−1) than the capacity of buffer 351-1. At this time, switch 391 is connecting the output of address filter 340-1 with buffer assembly 350-1, and switch 392 is connecting buffer assembly 350-1 to output port 360-1. The inputted packet is stored in buffer 351-1 within buffer assembly 350-1. The value of stored packet number counter 352-1 is increased by one (+1), and because this becomes equal to the capacity of buffer 351-1, connection controller 354-1 transmits to buffer controller 380 a control signal demanding connection with a reserve buffer. Buffer controller 380, having received the control signal, consults the reserve buffer administration table and, after assigning still unused reserve buffer assembly 355-1 within reserve buffer set 355 to output port 360-1, writes the identification number of output port 360-1 corresponding to reserve buffer assembly 355-1 in the reserve buffer administration table. At the same time, connection controller 380 switches switch 391 and connects address filter 340-1 with reserve buffer assembly 355-1. The packet that is transmitted addressed to output port 360-1 is next stored in reserve buffer assembly 355-1, following which all packets addressed to output port 360-1 are stored in reserve buffer assembly 355-1 until the number of packets stored in buffer assembly 350-1 becomes 0. When the number of packets stored in buffer 351-1 becomes 0, connection controller 353-1 within buffer assembly 350-1 transmits to buffer controller 380 a control signal indicating that buffer 351-1 is empty. Buffer controller 380, having received the control signal, connects address filter 340-1 and buffer assembly 350-1, switches the connection of inputted packets corresponding to output port 360-1 to one buffer of normal buffer set 350, and connects reserve buffer assembly 355-1 with output port 360-1. Buffer controller 380 releases reserve buffer assembly 355-1, rewrites the reserve buffer administration table, and erases the assignment of output port 360-1 to reserve buffer assembly 355-1 at the time reserve buffer assembly 355-1 becomes empty of packets. In this embodiment, although switching of connections is performed by incomplete matrix switches, switching may also be carried out by the bus.

Figure 8:
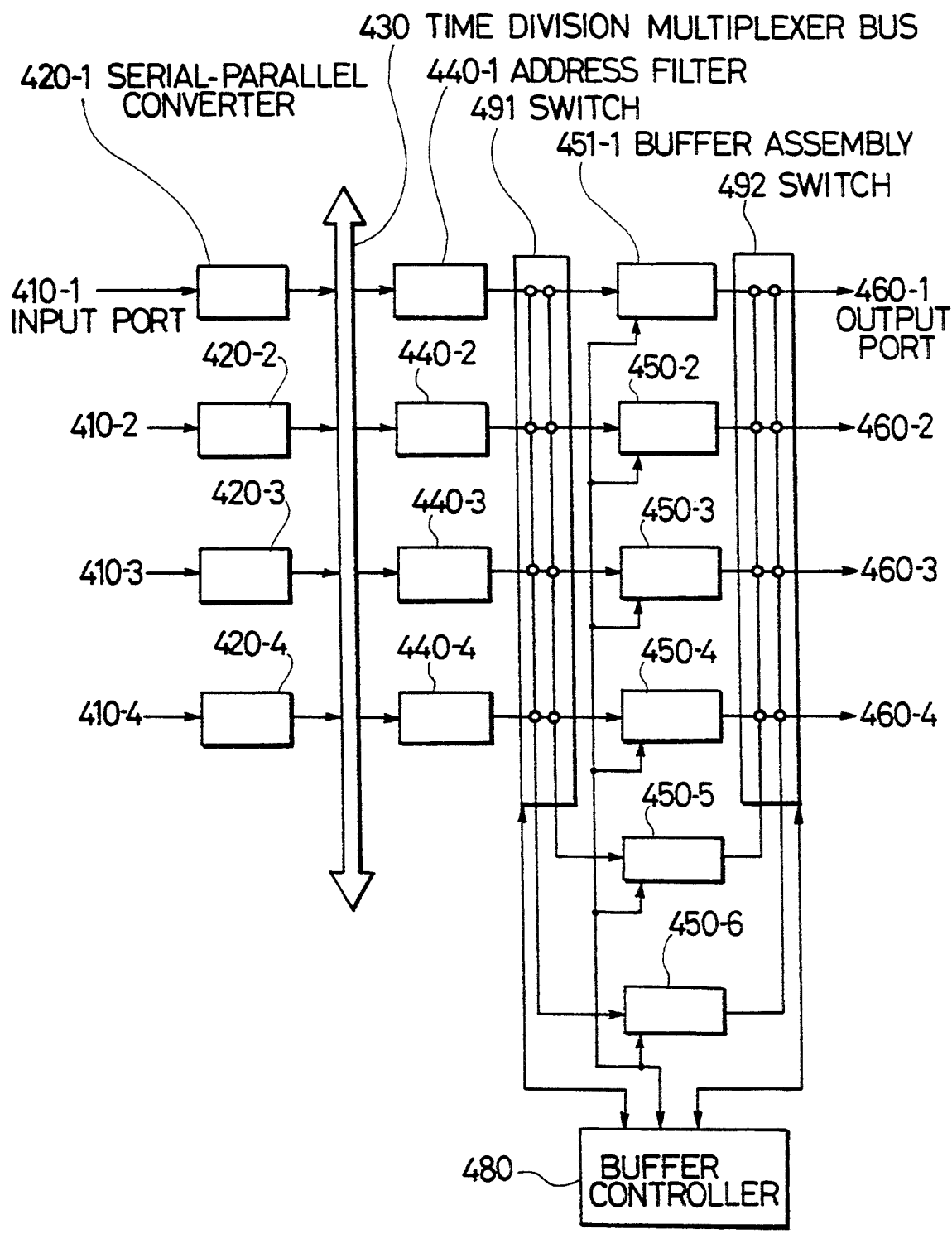
FIG. 8 is a block diagram showing the construction of the fourth embodiment of a packet switching apparatus of the present invention.

FIG. 8 shows a fourth embodiment of the packet switching apparatus of the present invention.

Figure 9:
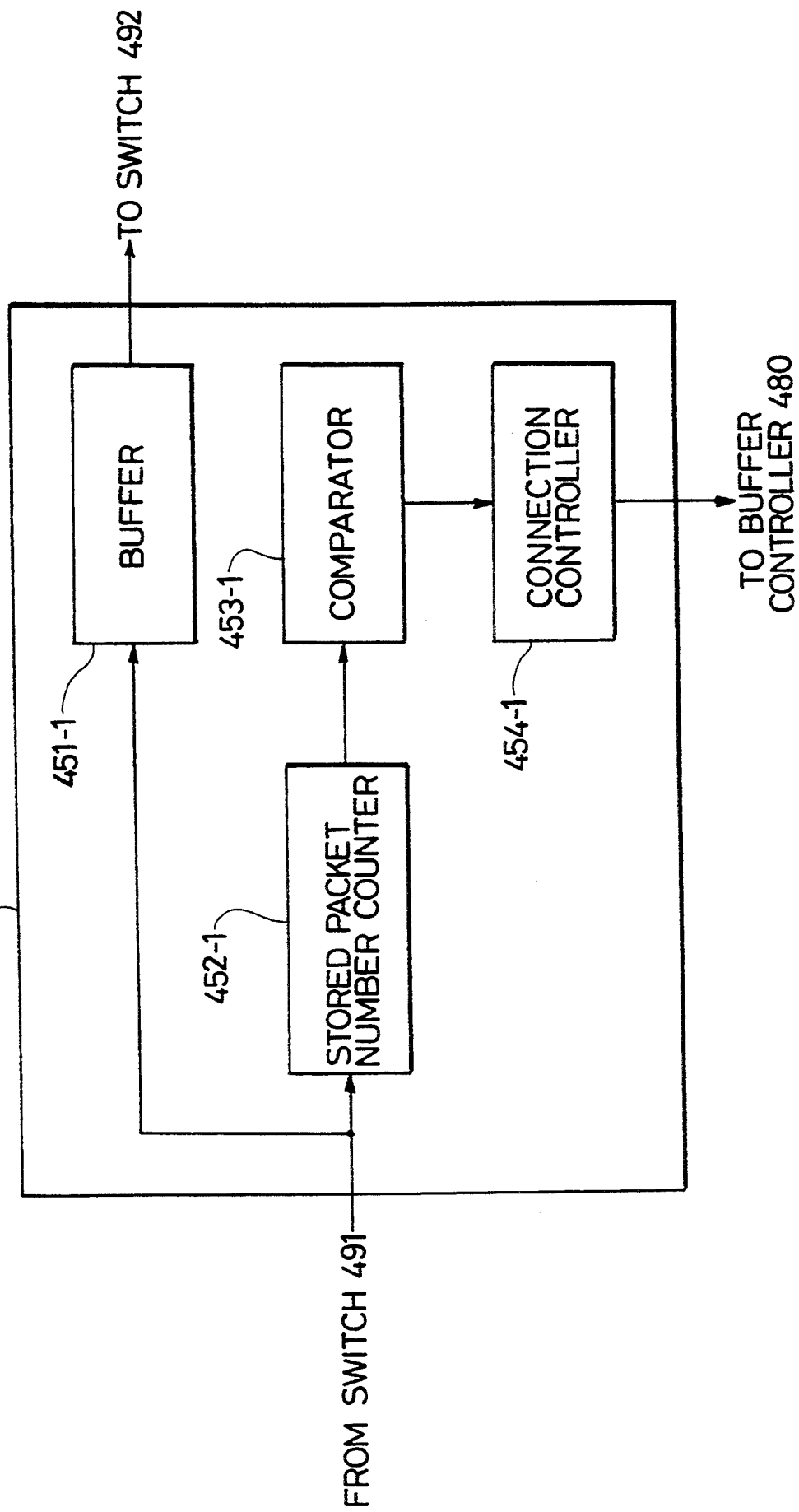
FIG. 9 is a block diagram showing the construction of buffer assembly 450-1 in FIG. 8.

In the third embodiment, the switches are incomplete matrix switches and the output of the address filters is outputted to buffers within the reserve buffer set in cases when the buffers within the normal buffer set are full. In the present embodiment, there is no distinction between normal and reserve for buffer assemblies 450-1–450-6, switches 491, 492 are both complete matrix switches, and, under the control of buffer controller 480, the output of address filters 440-1–440-4 can be connected to any of buffer assemblies 450-1–450-6. As a result, in contrast with the third embodiment in which [the controller] administers connection only with reserve buffers, buffer controller 480 administers connection with all buffers. The composition of buffer assemblies 450-1–450-6 is the same as in the third embodiment, and buffer assembly 450-1 is presented as an example in FIG. 9.

Buffer assembly 450-1 is made up of buffer 451-1; stored packet number counter 452-1 that counts the number of packets stored in buffer 451-1; comparator 453-1 that compares the count value of stored packet number counter 452-1 with the capacity of buffer 451-1; and connection controller 454-1 that transmits a control signal to buffer controller 480 according to the state of buffer assembly 450-1. Buffer controller 480 has a buffer administration table for administering the correspondence between buffers 451-1–451-6 and output port 460-1–460-4.

The operation of this embodiment will next be explained.

It will be supposed that packets addressed to output port 460-1 are inputted from input port 410-4, that address filter 440-1 and buffer assembly 450-2 are connected at switch 491, and buffer assembly 450-2 and output port 460-1 are connected at switch 492. The inputted packets are stored in buffer 451-2. The value of stored packet number counter 452-2 is increased by one (+1), and when it is equal to the capacity of buffer 451-2, connection controller 454-2 within buffer assembly 450-2 transmits to buffer controller 480 a control signal demanding connection to the next buffer. Buffer controller 480, having received the control signal demanding connection, consults the buffer administration table, assigns still unused buffer assembly 450-5 to output port 460-1, and writes to the buffer administration table the identification number of output port 460-1 in accordance with buffer assembly 450-5. At the same time, buffer controller 480 switches switch 491 and connects address filter 440-1 with buffer assembly 450-5. When the number of packets stored in buffer 451-2 becomes 0, connection controller 454-2 transmits to buffer controller 480 a control signal demanding cut-off from buffers. Buffer controller 480, having received the control signal demanding cut-off, erases the identification number of the output port assigned to buffer assembly 450-2 in the buffer administration table and switches switch 492 to connect buffer assembly 450-5 with output port 460-1. In this embodiment, although connections are switched by means of complete matrix switches 491,492, the bus may also be used in place of complete matrix switches.

FIG. 10 shows a fifth embodiment of the packet switching apparatus of the present invention.

In the third and fourth embodiments, address filters are arranged fixed to each output port, and connections from the address filters to the buffers are switched under the control of buffer controllers. In contrast, in the present embodiment, address filter 540-1–540-6 are provided in a number greater than the number of output ports 560-1–560-4, and in addition, six buffer assemblies 550-1–550-6 are provided corresponding to address filters 540-1–540-6. Buffer assemblies 550-1–550-6 are connected at switch 591 in order to connect with arbitrary output ports 560-1 560-4. In addition, buffer controller 580 is provided to control switching of connections corresponding to each output port 560-1–560-4 of address filters 540-1–540-6. The composition of buffer assemblies 550-1–550-6 is similar to the cases of the third and fourth embodiments, and FIG. 11 shows buffer assembly 550-1 as an example.

Buffer assembly 550-1 is made up of buffer 551-1; stored packet number counter 552-1 that counts the number of packets stored in buffer 551-1; comparator 553-1 that compares the count value of stored packet number counter 552-1 with the capacity of buffer 551-1; and connection controller 554-1 that transmits a control signal to buffer controller 580 according to the state of buffer assembly 550-1. Buffer controller 580 has an address filter administration table that indicates the correspondence between address filters 540-1–540-6 and the identification number of output ports 560-1–560-4.

The operation of the present embodiment will next be explained.

It will be supposed that packets addressed to output port 560-1 are inputted from input port 510-4, address filter 540-2 is set to receive packets addressed to output port 560-1, and buffer assembly 550-2 and output port 560-1 are connected at switch 591. The packets received at address filter 540-2 are sent to buffer assembly 550-2 and stored in buffer 551-2. At this time, if the count value at stored packet number counter 552-2 is equal to the capacity of buffer 551-2, connection controller 554-2 transmits to buffer controller 580 a control signal demanding assignment of the next address filter. Buffer controller 580, having received this control signal, consults the address filter administration table, assigns still unused address filter 540-5 to output port 560-1 and then simultaneously writes this to the address filter administration table and sets address filter 540-1 to receive packets addressed to output port 560-1. When the number of packets stored in buffer 551-2 becomes 0, connection controller 554-2 transmits to buffer controller 580 a control signal demanding release of address filter 540-2. Buffer controller 580, having received the control signal demanding release, erases the identification number of output port 560-1 assigned to address filter 540-2 in the address filter administration table. At the same time, buffer controller 580 switches switch 591 and connects buffer assembly 550-5 with output port 560-1. In this embodiment, although switching of connections between buffer assemblies 550-1–550-6 and output ports 560-1–560-4 is performed by complete matrix switches, the bus may also be used in place of the matrix switches.

What is claimed is:

1. A packet switching apparatus that is an output-buffer packet switching apparatus wherein packets inputted from a plurality of input ports are multiplexed and, based on address information conferred to said packets, stored into any of buffers corresponding to a plurality of output ports, following which said packets are outputted to said output ports, the packet switching apparatus comprising:

address filters provided for each and every output port;

buffers provided for each and every output port that store packets outputted from said address filters;

reserve memories divided into a plurality of blocks that are used by being connected to said buffers in units of blocks;

control means that monitors the number of stored packets in said buffers and when the number of said stored packets exceeds a threshold value, connects said reserve memories to said buffers, and when said number of stored packets exceeds said buffer capacity, stores inputted packets into said reserve memories, and during the time said buffers and said reserve memories are connected, each time packets stored within said buffers are outputted, transmits packets stored within said reserve memories to said buffers.

2. The packet switching apparatus according to claim 1 characterized in that said threshold value is equal in value to the capacity of said buffers.

3. The packet switching apparatus according to claim 1 characterized in that said threshold value is a first threshold value smaller in value than the capacity of said buffers, and a second threshold value is provided that is smaller in value than the first threshold value; and said control means connects said reserve memories to said buffers when said number of stored packets exceeds said first threshold value, stores inputted packets to said reserve memories when said number of stored packets exceeds said buffer capacity, and releases said reserve memories from said buffers when said number of stored packets falls below said second threshold value.

4. A packet switching apparatus that is an output-buffer packet switching apparatus wherein packets inputted from a plurality of input ports are multiplexed and, based on address information conferred to said packets, stored into any of buffers corresponding to a plurality of output ports, following which said packets are outputted to said output ports, the packet switching apparatus comprising:

address filters provided for each and every output port;

buffers provided for each and every output port that store packets outputted from said address filters;

reserve memories divided into a plurality of blocks, the blocks being used by being connected to said buffers in units of blocks;

control means that monitors the number of stored packets in said buffers and when the number of said stored packets exceeds a threshold value, connects said reserve memories to said buffers and when the number of said stored packets exceeds the capacity of said buffers, stores inputted packets into said reserve memories, and during the time said buffers and said reserve memories are connected, when there are no stored packets in said buffers, connects said reserve memories to said output ports and outputs packets stored in said reserve memories.

5. The packet switching apparatus according to claim 4 characterized in that said threshold value is equal in value to the capacity of said buffers.

6. A packet switching apparatus that is an output-buffer packet switching apparatus wherein packets inputted from a plurality of input ports are multiplexed and, based on address information conferred to said packets, stored into any of buffers corresponding to a plurality of output ports, following which said packets are outputted, the packet switching apparatus comprising:

address filters provided for each and every output port;

normal buffers provided for each and every output port that store packets outputted from said address filters;

a reserve memory set made up from one or more reserve buffers;

a first connection means for connecting said address filters with said normal buffers and said reserve buffers;

a second connection means for connecting said normal buffers and said reserve buffers with said output ports;

control means that monitors the number of stored packets in said normal buffers and when the number of said stored packets exceeds a threshold value, connects said address filters to reserve buffers within said reserve buffer set by means of the first connection means, and when the number of said stored packets exceeds the capacity of said buffers, during the time until the number of said stored packets reaches 0, causes inputted packets to be stored in said reserve buffers, and when the number of said stored packets becomes 0, both connects said address filters with said normal buffers and connects said reserve buffers with said output ports by means of the second connection means.

7. The packet switching apparatus according to claim 6 characterized in that said threshold value is equal in value to the capacity of said buffers.

8. A packet switching apparatus that is an output-buffer packet switching apparatus wherein packets inputted from a plurality of input ports are multiplexed and, based on address information conferred to said packets, stored into any of buffers corresponding to a plurality of output ports, following which said packets are outputted, the packet switching apparatus comprising:

address filters provided for each and every output port;

buffers that are provided in a greater number than the number of said output ports and that store packets outputted from said address filters;

a third connection means that connects said address filters with arbitrary said buffers;

a fourth connection means that connects arbitrary said buffers with said output ports;

control means that monitors the number of stored packets in said buffers and when the number of said stored packets exceeds a threshold value, connects said address filters to an empty buffer by means of the third connection means, and when the number of said stored packets exceeds the capacity of said buffers, stores inputted packets in the latter buffer, and when the number of stored packets in the former buffers becomes 0, switches the connection with output ports from the former buffers to the latter buffer by means of the fourth switching means.

9. The packet switching apparatus according to claim 8 characterized in that said threshold value is equal in value to the capacity of said buffers.

10. A packet switching apparatus that is an output-buffer packet switching apparatus wherein packets inputted from a plurality of input ports are multiplexed and, based on address information conferred to said packets, stored into any of buffers corresponding to a plurality of output ports, following which said packets are outputted, the packet switching apparatus comprising:

address filters provided in a number greater than the number of said output ports;
   buffers provided corresponding to said address filters;
   connection means for connecting said buffers with arbitrary said output ports;
   control means that monitors the number of stored packets in said buffers and, when the number of said stored packets exceeds a threshold value, sets the addresses of packets addressed to identical output ports to still unused address filters, and when the number of said stored packets exceeds the capacity of said buffers, stores inputted packets in buffers corresponding to those address filters, and when the number of said stored packets becomes 0, switches the connection with said output ports from the former buffers to the latter buffers by means of the fifth connection means.

11. The packet switching apparatus according to claim 10 characterized in that said threshold value is equal in value to the capacity of said buffers.

* * * * *